United States Patent
Kim et al.

(10) Patent No.: US 10,644,298 B2
(45) Date of Patent: May 5, 2020

(54) BATTERY CELL COMPRISING ELECTRODE LEAD HAVING PROTRUDING EXTENSION AND TAB CONNECTOR

(71) Applicant: LG Chem, Ltd., Seoul (KR)

(72) Inventors: Yong Jun Kim, Daejeon (KR); Seok Koo Kim, Daejeon (KR); Chae Ah Kim, Daejeon (KR); Se Mi Park, Daejeon (KR); Seung Hyun Chung, Daejeon (KR)

(73) Assignee: LG Chem, Ltd. (KR)

( * ) Notice: Subject to any disclaimer, the term of this patent is extended or adjusted under 35 U.S.C. 154(b) by 153 days.

(21) Appl. No.: 15/753,765

(22) PCT Filed: Sep. 12, 2016

(86) PCT No.: PCT/KR2016/010299
§ 371 (c)(1),
(2) Date: Feb. 20, 2018

(87) PCT Pub. No.: WO2017/082530
PCT Pub. Date: May 18, 2017

(65) Prior Publication Data
US 2018/0254468 A1 Sep. 6, 2018

(30) Foreign Application Priority Data

Nov. 11, 2015 (KR) .................. 10-2015-0157877

(51) Int. Cl.
*H01M 2/26* (2006.01)
*H01M 10/0525* (2010.01)
*H01M 10/058* (2010.01)

(52) U.S. Cl.
CPC ........... *H01M 2/266* (2013.01); *H01M 2/263* (2013.01); *H01M 10/058* (2013.01);
(Continued)

(58) Field of Classification Search
CPC .. H01M 2/1223; H01M 2/1229; H01M 2/266; H01M 2/263
See application file for complete search history.

(56) References Cited

U.S. PATENT DOCUMENTS

| | | | |
|---|---|---|---|
| 2002/0081489 A1* | 6/2002 | Ng | H01M 2/26 429/161 |
| 2003/0232243 A1* | 12/2003 | Hong | H01M 2/1653 429/161 |

(Continued)

FOREIGN PATENT DOCUMENTS

| CN | 1855600 A | 11/2006 |
|---|---|---|
| CN | 102082254 A | 6/2011 |

(Continued)

OTHER PUBLICATIONS

Search report from International Application No. PCT/KR2016/010299, dated Dec. 8, 2016.

(Continued)

*Primary Examiner* — Maria Laios
(74) *Attorney, Agent, or Firm* — Lerner, David, Littenberg, Krumholz & Mentlik, LLP

(57) ABSTRACT

The present invention provides a battery cell including: an electrode assembly including an electrode tab protruding toward at least one external side; a battery case including a receiving portion on which the electrode assembly is received; and an electrode lead connected to the electrode tab to be connected to an external device, wherein the electrode lead may include: a tab connecting portion electrically connected to the electrode tab; and a protruding extension protruding outside of the battery case in a state of extending from the tab connecting portion to be electrically connected to the external device, and the tab connecting portion may be formed so that a length of a width direction (Continued)

perpendicular to a protruding direction of the electrode tab may be relatively larger than that of the electrode tab.

19 Claims, 5 Drawing Sheets

(52) U.S. Cl.
CPC .... *H01M 10/0525* (2013.01); *H01M 2220/20* (2013.01); *Y02T 10/7011* (2013.01)

(56) References Cited

U.S. PATENT DOCUMENTS

| | | | |
|---|---|---|---|
| 2006/0188777 A1* | 8/2006 | Kaneta | H01M 2/266 429/128 |
| 2006/0238162 A1 | 10/2006 | Cheon et al. | |
| 2006/0263683 A1 | 11/2006 | Yoon et al. | |
| 2008/0060189 A1* | 3/2008 | Daidoji | H01M 2/021 29/623.1 |
| 2010/0055558 A1 | 3/2010 | Choi et al. | |
| 2010/0173193 A1 | 7/2010 | Kim | |
| 2011/0052964 A1 | 3/2011 | Kim et al. | |
| 2011/0129707 A1* | 6/2011 | Ahn | H01M 2/22 429/94 |
| 2011/0129726 A1 | 6/2011 | Tsukamoto et al. | |
| 2012/0177982 A1 | 7/2012 | Byun | |
| 2013/0143109 A1 | 6/2013 | Kim et al. | |
| 2014/0349181 A1 | 11/2014 | Lim et al. | |
| 2018/0254468 A1 | 9/2018 | Kim et al. | |

FOREIGN PATENT DOCUMENTS

| | | |
|---|---|---|
| CN | 201946438 U | 8/2011 |
| CN | 104953171 A | 9/2015 |
| CN | 107949933 A | 4/2018 |
| EP | 1455400 A3 | 1/2007 |
| EP | 1901387 A2 | 3/2008 |
| EP | 2216841 A1 | 8/2010 |
| JP | H09213299 A | 8/1997 |
| JP | 2002280269 A | 9/2002 |
| JP | 2007059249 A | 3/2007 |
| JP | 2009532843 A | 9/2009 |
| JP | 2011507184 A | 3/2011 |
| JP | 2011113960 A | 6/2011 |
| JP | 2012146651 A | 8/2012 |
| JP | 2013534361 A | 9/2013 |
| JP | 2014182993 A | 9/2014 |
| JP | 2015513183 A | 4/2015 |
| KR | 20060116049 A | 11/2006 |
| KR | 20080023182 A | 3/2008 |
| KR | 20130112380 A | 10/2013 |
| KR | 20140110136 A | 9/2014 |
| KR | 20150043093 A | 4/2015 |

OTHER PUBLICATIONS

Extended European Search Report for Application No. 16864456.5 dated May 29, 2018, 6 pages.

Search Report from Chinese Office Action for Chinese Application No. 201680050159.1 dated Feb. 6, 2020.

* cited by examiner

BATTERY CELL COMPRISING ELECTRODE LEAD HAVING PROTRUDING EXTENSION AND TAB CONNECTOR

CROSS-REFERENCE TO RELATED APPLICATION(S)

The present application is a national phase entry under 35 U.S.C. § 371 of International Application No. PCT/KR2016/010299, filed Sep. 12, 2016, published in Korean, which claims priority from Korean Patent Application No. 10-2015-0157877 filed on Nov. 11, 2015 with the Korean Intellectual Property Office, the entire contents of both of which are incorporated herein by reference.

Technical Field

The present invention relates to a battery cell including an electrode lead having a protruding extension and a tab connector.

Background Art

Recently, interest in price increases of an energy source and environmental pollution has been amplified due to depletion of fossil fuels and the interest of is being amplified, thus a demand for an environmentally friendly alternative energy source is becoming an indispensable factor for future life. Therefore, various researches on power generation technologies such as nuclear power, solar power, wind power, and tidal power have been ongoing, and electric power storage devices for more efficient use of the generated energy have also been attracting much attention.

Particularly, as technology development and demand for mobile devices have increased, there has been a rapid increase in demand for rechargeable batteries as energy sources, and accordingly, a lot of researches on batteries that may meet various demands have been conducted.

Generally, in terms of a shape of a battery, there is a high demand for prismatic and pouch-type rechargeable batteries with a small thickness that may be applied to products such as mobile phones, and in terms of a material of the battery, there is a high demand for lithium rechargeable batteries such as a lithium ion battery, a lithium ion polymer battery, and the like, which have advantages such as high energy density, a high discharge voltage, and output stability.

In addition, the rechargeable battery is classified according to a structure of an electrode assembly in which a positive electrode, a negative electrode, and a separation membrane interposed between the positive electrode and the negative electrode are stacked, and for example, the rechargeable battery may be classified into a jelly-roll type (wound type) of electrode assembly having a structure in which long sheet-type positive and negative electrodes are wound with a separation membrane therebetween, a stack type (stacked type) of electrode assembly having a structure in which a plurality of positive and negative electrodes that are cut to a predetermined size unit are sequentially stacked with a separation membrane therebetween, and the like. Recently, in order to solve problems of the jelly-roll type of electrode assembly and the stacked electrode assembly, as an electrode assembly of an advanced mixed type of the jelly-roll type and the stack type, a stacked/folding type of electrode assembly having a structure in which unit cells in which positive and negative electrodes of a predetermined unit are stacked with a separation membrane therebetween are sequentially wound while being positioned on a separation film, has been developed.

Further, the rechargeable battery is classified according to a battery case, and for example, may be classified into a cylindrical battery and a prismatic battery of which an electrode assembly is embedded in a cylindrical or prismatic metal can, and a pouch-type battery of which an electrode assembly is embedded in a pouch-type case of an aluminum laminate sheet.

Particularly, recently, the pouch-type battery having a stack or stacked/folded type of electrode assembly embedded in the pouch-type battery case of the aluminum laminate sheet has attracted a lot of attention and has been gradually increased in usage due to a low manufacturing cost, small weight, and easy shape deformation.

FIG. 1 illustrates a schematic view of a structure of a conventional pouch-type battery cell.

Referring to FIG. 1, a battery cell 100 is formed to have a structure in which an external side 112 of a pouch-type battery case 110 is sealed by heat fusion in a state in which an electrode assembly 120 is received in a receiving portion 111 of the pouch-type battery case 110 made of a laminate sheet.

The electrode assembly 120 includes a positive electrode tab 121 and a negative electrode tab 122 protruding toward opposite external sides facing each other, the positive electrode tab 121 and the negative electrode tab 122 are respectively connected to a positive electrode lead 131 and a negative electrode lead 132, and the positive electrode lead 131 and the negative electrode lead 132 protrude outside the battery case 110 while being respectively connected to the positive electrode tab 121 and the negative electrode tab 122.

The positive electrode tab 121 and the negative electrode tab 122 are formed to have the same size, and the positive electrode lead 131 and the negative electrode lead 132 are formed to have the same size.

However, since the battery cell 100 is electrically connected to an external device through the electrode leads 131 and 132 and the electrode tabs 121 and 122 that have limited widths, while the battery cell 100 is repeatedly charged and discharged, a current intensively flows only into a connecting portion of the electrode leads 131 and 132 and the electrode tabs 121 and 122, thus heat is intensively generated at the connecting portion of the electrode leads 131 and 132 and the electrode tabs 121 and 122.

The resulting intensive deterioration at such a limited portion lowers thermal stability of the battery, and increases the risk of fire due to the deterioration.

In addition, since the pouch-type battery cell 100 does not have sufficiently high strength due to material characteristics of the battery case 110, it is not capable of stably protecting the electrode assembly 120 received in the battery case 110 against external impact, thus there is a limit to having desired structural stability.

Further, since a widths W1 of the electrode tabs 121 and 122 is the same as a width W2 of the electrode leads 131 and 132, when the electrode tabs 121 and 122 and the electrode leads 131 and 132 are connected while the battery cell is manufactured, a step may occur, and the step may serve as a factor for promoting degradation of thermal stability of the battery cell 100.

Accordingly, there is a high need for the development of a technology that may substantially solve the problem.

DISCLOSURE

Technical Problem

The present invention has been made to solve the above-mentioned problems of the prior art and conventional technical problems.

The inventors of the present application have conducted intensive research and various experiments. The found that, as described later, a tab connecting portion of an electrode lead is formed to have a relatively large size as compared with an electrode tab, thereby heat generated at the connecting portion between the electrode lead and the electrode tab may be effectively eliminated through the tab connecting portion having a larger size, the structural stability of the battery cell may be improved by supplementing the mechanical rigidity of the connecting portion between the electrode lead and the electrode tab, and since the electrode lead and the electrode tab may be connected more easily, occurrence of a step may be prevented such that a defect rate of a product may be reduced, and simultaneously, overall stability of the battery cell may be improved. Thus, the present invention has been accomplished.

Technical Solution

An exemplary embodiment of the present invention for these purposes provides a battery cell including:

an electrode assembly including an electrode tab protruding toward at least one external side;

a battery case including a receiving portion on which the electrode assembly is received; and an electrode lead connected to the electrode tab to be connected to an external device, wherein the electrode lead may include:

a tab connecting portion electrically connected to the electrode tab; and a protruding extension protruding outside of the battery case in a state of extending from the tab connecting portion to be electrically connected to the external device, and the tab connecting portion may be formed so that a length of a width direction perpendicular to a protruding direction of the electrode tab is relatively larger than that of the electrode tab.

Accordingly, the heat generated at the connecting portion between the electrode lead and the electrode tab may be effectively eliminated through the tab connecting portion having the larger size, the structural stability of the battery cell may be improved by supplementing the mechanical rigidity of the connecting portion between the electrode lead and the electrode tab, and since the electrode lead and the electrode tab may be connected more easily, the occurrence of the step may be prevented such that the defect rate of the product may be reduced, and simultaneously, the overall stability of the battery cell may be improved.

In this case, the electrode lead and the electrode tab may be connected by welding so as to maintain a stable connection state, and more particularly, they may be connected by ultrasonic welding or laser welding.

In an exemplary embodiment, the battery case may be a pouch-type case made of a laminate sheet including a resin layer and a metal layer, and an external side of the receiving portion of the electrode assembly may be sealed by heat fusion.

As described above, since a typical pouch-type battery cell does not have sufficiently high strength due to material characteristics of the battery case made of the laminate sheet, it is not capable of stably protecting the electrode assembly received in the battery case against external impact, thus there is a limit to having the desired structural stability.

However, according to the battery cell of the present invention, the tab connecting portion of the electrode lead electrically connected to the electrode tab is relatively larger than the electrode tab, thus it is possible to effectively compensate the rigidity of the external side of the portion from which the electrode tab protrudes.

The tab connecting portion may be formed so that a length of the width direction perpendicular to the protruding direction of the electrode tab may be smaller than a width of the receiving portion of the battery case corresponding thereto.

Specifically, the tab connecting portion is formed so that the length of the width direction perpendicular to the protruding direction of the electrode tab is relatively larger than that of the electrode tab and is smaller than that of the receiving portion of the battery case corresponding thereto, thus the tab connecting portion may be easily and stably positioned inside the receiving portion of the battery case while manufacturing the battery cell.

At least some of the tab connecting portion having the length of the width direction being relatively larger than that of the electrode tab may be positioned at the heat fusion external side.

Specifically, the external side at which some of the tab connecting portion is positioned may be the heat fusion external side positioned so that the protruding extension of the electrode lead protrudes, or may be at least one of opposite lateral heat fusion external sides.

Herein, the opposite lateral heat fusion external sides are the heat fusion external sides extending from the opposite end portions of the heat fusion external sides at which the protruding extensions are positioned, that is, they are heat fusion external sides positioned in the width direction perpendicular to the protruding direction of the protruding extension.

Accordingly, the tab connecting portion may be stably fixed to the heat fusion external side of the battery case while the external side of the battery case is sealed by heat fusion, thus, when the tab connecting portion moves in the battery case, it is possible to effectively prevent an internal short circuit or structural damage that may occur due to direct contact with the electrode assembly.

In addition, when some of the tab connecting portion is positioned at the heat fusion external side of the direction in which the protruding extension protrudes, by improving structural stability of a sealing portion formed by the heat fusion at the external side, electrical connecting members such as a PCM mounted on the sealing portion may be further stably mounted.

In an exemplary embodiment, the tab connecting portion may be formed so that opposite end portions of the width direction perpendicular to the protruding direction of the electrode tab may have lengths respectively reaching opposite lateral heat fusion external sides of the battery case.

Accordingly, since the opposite end portions of the width direction perpendicular to the protruding direction of the electrode tab is fixed to the opposite lateral heat fusion external sides of the battery case, the tab connecting portion may be further stably positioned in the battery case.

In this case, an insulating film may be interposed between the opposite end portions of the tab connecting portion and the opposite lateral heat fusion external sides of the battery case so that a sealing force by the heat fusion may be improved.

Generally, the electrode lead may be made of the same material as the electrode tab so as to provide a stable bonding force with the electrode tab and to provide a stable electrical connection, and more specifically, as the materials of the electrode lead that do not cause chemical reaction in the battery and have conductivity, stainless steel, aluminum, nickel, titanium, and sintered carbon, or materials surface-treated with carbon, nickel, titanium, or silver on a surface of aluminum or stainless steel may be used.

Alternatively, the battery case may be formed with a heat-fusible resin sealant layer on the innermost side thereof so as to provide the sealing property by the heat fusion.

Accordingly, when the external side of the battery case is heat-fused, respective portions of the tab connecting portion and the battery case facing each other are made of different materials, thus the insulating film is interposed between the opposite end portions of the tab connecting portion and the opposite lateral heat fusion external sides of the battery case, thereby improving the sealing force by the heat fusion.

In addition, even when some of the tab connecting portion is positioned at the heat fusion external side of the direction in which the protruding extension protrudes, the insulating film may be interposed between the tab connecting portion and the heat fusion external side so as to improve the sealing force by the heat fusion.

At least one of the opposite end portions of the tab connecting portion may be provided with a venting flow path so that gas inside the battery case may be discharged to the outside.

More specifically, when the typical pouch-type battery cell is exposed to a high temperature environment, or when an internal short circuit occurs due to malfunction and the like, a decomposition reaction of an electrolytic solution occurs at an interface of the positive electrode, so that a large amount of gas is generated. As a result, a swelling phenomenon occurs in which the battery cell swells due to an increase of the internal pressure. This degrades the structural stability of the battery cell in a limited mounted space of the device.

Therefore, according to the battery cell of the present invention, since the venting flow path is formed at least one end portion of the opposite end portions of the tab connecting portion, the gas generated inside the battery cell is discharged to the outside through the venting flow path of the tab connecting portion, thereby securing safety.

In this case, the venting flow path may be formed in a direction of the lateral heat fusion external side of the battery case from the external side of the tab connecting portion adjacent to the electrode assembly, and an openable and closable venting valve may be positioned at a position corresponding to an end portion of the venting flow path in the lateral heat fusion external side of the battery case.

The venting valve may be separated from the end portion of the venting flow path to discharge gas when a pressure inside the battery cell is equal to and more than a threshold pressure.

Therefore, the venting flow path may further easily guide the gas generated by the decomposition reaction of the electrolytic solution at the interface of the positive electrode of the electrode assembly toward the outside of the battery case, and when the internal pressure of the battery cell reaches the threshold pressure, the venting valve is separated to discharge the gas inside the battery cell to the outside, thereby securing the safety.

The threshold pressure at which the venting valve is separated may be 2 atm to 4 atm, and more specifically, may be 3 atm.

If the threshold pressure is less than 2 atm, the threshold pressure at which the venting valve is separated is excessively low, so that the venting valve may be separated during a change of the internal pressure occurring during a normal operation of the battery cell. On the contrary, if the threshold pressure is greater than 4 atm, the threshold pressure is excessively high, so that the desired effect may not be obtained.

In an exemplary embodiment, the tab connecting portion may be formed so that a length of the same direction as the protruding direction of the electrode tab may be 10% to 90% of a protruding length of the electrode tab.

If the length of the tab connecting portion is less than 10% of the protruding length of the electrode tab, the width at which the tab connecting portion and the electrode tab are connected is not sufficiently secured, so that a desired bonding force may not be obtained, and on the contrary, if the length of the tab connecting portion is greater than 90% of the protruding length of the electrode tab, after the tab connecting portion is connected to the electrode tab, the tab connecting portion directly contacts the electrode assembly, so that an internal short circuit may occur or the electrode assembly or the tab connecting portion may be structurally damaged.

The electrode tab may be formed so that the length of the width direction perpendicular to the protruding direction may be the same as a width of the external side of the electrode assembly corresponding thereto.

Generally, the electrode tab is formed by notching an uncoated portion of an electrode sheet.

In this case, the notching is generally performed as a punching process using a metal mold, however, due to a step generated in the punching process, defects may occur at the external side of the electrode adjacent to the electrode tab, including an uncoated portion in which an electrode active material is not coated.

However, in the battery cell according to the present invention, since the length of the width direction perpendicular to the protruding direction of the electrode tab is the same as the width of the external side of the electrode assembly corresponding thereto, none of the external side in which the electrode tab is formed as the uncoated portion in which the electrode active material is not coated, thus the defects may not occur.

In addition, while the electrode having the above-described structure is manufactured, when the electrode sheet is formed so that the length of the uncoated portion on which the electrode active material is not coated is the same as that of the electrode tab, a separate notching process for forming the electrode tab is not required, so that the manufacturing process may be further simplified.

Further, since the electrode tab is formed to have a wider structure than the electrode tab of the conventional battery cell, the connecting portion of the electrode tab connected to the tab connecting portion by welding may be further widened, thereby obtaining a greater bonding force.

Moreover, due to the structure of the electrode tab, a current flowing in a charging or discharging process of the battery cell may flow through the electrode tab having a larger area, thereby minimizing heat that may be generated at the connection portion between the electrode tab and the electrode lead. Therefore, deterioration of the battery cell may be prevented, and stability thereof may be improved.

In an exemplary embodiment, electrode tabs having different polarities from each other may protrude toward the external sides facing each other.

Accordingly, the tab connecting portions having wide structures may be further easily connected to the electrode tabs according to their polarities without interfering with each other.

However, the protruding structure of the electrode tab is not limited thereto, and in some exemplary embodiments, electrode tabs having different polarities from each other may protrude toward the same external side.

In this case, an insulator may be interposed between the tab connecting portions of the electrode leads connected to the electrode tabs.

As described above, the electrode lead may generally be made of the same material as the electrode tab, and thus, when the tab connecting portions of the electrode leads respectively connected to the electrode tabs having different polarities directly contact each other, an internal short circuit may occur.

Therefore, the insulator is interposed between the tab connecting portions of the electrode leads connected to the electrode tabs having different polarities, thereby preventing the tab connecting portions from directly contacting each other to prevent the problems.

In this case, if the tab connecting portions connected to the electrode tabs having different polarities are stably insulated, types of the tab connecting portions are not limited as the insulator, and more specifically, surfaces of the tab connecting portions facing each other may be coated with an insulating material, so that the same effect may be obtained.

In addition, like between the tab connecting portion and the heat fusion external side of the battery case, an insulating film is interposed between the protruding extension of the electrode lead and the heat fusion external side of the battery case, thus the sealing force by the heat fusion may be improved.

In an exemplary embodiment, the electrode assembly may be formed to have a structure in which a positive electrode sheet and a negative electrode sheet between which a separation membrane sheet is interposed are wound.

However, when the electrode assembly, which includes the electrode tab protruding toward at least one external side, is stably mounted in the battery case, the structure thereof is not limited, and more specifically, the electrode assembly may be formed to have a structure in which a positive electrode, a negative electrode, and a separation membrane interposed between the positive electrode and the negative electrode are sequentially stacked, or the electrode assembly may be formed to have a structure in which unit cells of a stacked structure formed with a positive electrode, a negative electrode, and a separation membrane interposed between the positive electrode and the negative electrode are continuously wound by a separation film.

The battery cell according to the present invention is not particularly limited to a type thereof, but as a specific example, it may be a lithium rechargeable battery such as a lithium ion battery, a lithium ion polymer battery, or the like, which has advantages such as high energy density, a high discharge voltage, and output stability.

Generally, the lithium rechargeable battery includes a positive electrode, a negative electrode, a separator, and a non-aqueous electrolyte solution containing a lithium salt.

The positive electrode is prepared, for example, by coating a mixture of a positive electrode active material, a conductive material, and a binder on a positive electrode current collector, and then drying the resultant. Alternatively, a filler may be further added to the mixture.

The positive active material may be a layered compound such as a lithium cobalt oxide ($LiCoO_2$), a lithium nickel oxide ($LiNiO_2$), and the like, or a compound substituted with one or more transition metals; a lithium manganese oxide such as $LiMnO_3$, $LiMn_2O_3$, and $LiMnO_2$ represented by a chemical formula $Li_{1+x}Mn_{2-x}O_4$ (where x is 0 to 0.33); a copper oxide such as lithium copper oxide ($Li_2CuO_2$); a vanadium oxide such as $LiV_3O_8$, $LiFe_3O_4$, $V_2O_5$, $Cu_2V_2O_7$, and the like; a Ni-site lithium nickel oxide represented by a chemical formula $LiNi_{1-x}M_xO_2$ (where, M=Co, Mn, Al, Cu, Fe, Mg, B, or Ga, and x=0.01 to 0.3); a lithium manganese composite oxide represented by a chemical formula $LiMn_{2-x}M_xO_2$ (where M=Co, Ni, Fe, Cr, Zn, or Ta, and x=0.01 to 0.1) or $Li_2Mn_3MO_8$ (where M=Fe, Co, Ni, Cu, or Zn); $LiMn_2O_4$ in which a part of Li in the formula is substituted with an alkaline earth metal ion; a disulfide compound; $Fe_2(MoO_4)_3$; and the like, but this is not restrictive.

The conductive material is usually added in an amount of 1% to 30% by weight based on the total weight of the mixture including the cathode active material. Such a conductive material is not particularly limited as long as it has electrical conductivity and does not cause a chemical change in the battery, and examples thereof include graphite such as natural graphite and artificial graphite; carbon compounds such as carbon black, acetylene black, Ketjen black, channel black, furnace black, lamp black, and summer black; conductive fibers such as carbon fiber and metal fiber; metal powders such as carbon fluoride, aluminum, and nickel powders; conductive whiskers such as zinc oxide and potassium titanate; conductive metal oxides such as titanium oxide; conductive materials such as polyphenylene derivatives; and the like can be used.

The binder is a component that assists in bonding between the active material and the conductive material and bonding to the current collector, and is typically added in an amount of 1 wt % to 30 wt % based on the total weight of the mixture containing the cathode active material. Examples of such binders include polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, fluorine rubber, various copolymers, and the like.

The filler is selectively used as a component for suppressing expansion of the positive electrode, and is not particularly limited as long as it is a fibrous material that does not cause a chemical change in the battery. Examples of the filler include olefin polymers such as polyethylene and polypropylene, fibrous materials such as glass fiber and carbon fiber, and the like.

The negative electrode is manufactured by applying and drying a negative active material on a negative current collector, and as necessary, the above-described components may be selectively further included. Examples of the negative electrode active material include carbon such as non-graphitized carbon and graphite carbon; Al, B, P, Si, elements of Group 1 of the periodic table, $Li_xFe_2O_3$ ($0 \leq X \leq 1$), $Li_xWO_2$ ($0 \leq X \leq 1$), $Sn_xMe_{1-x}Me'_yO_z$ (Me: Mn, Fe, Pb, Ge, Me', Al, B, P, Si, elements of Groups 1, 2, and 3 of the periodic table, or a halogen; $0 < x \leq 1$; $1 \leq y \leq 3$; $1 \leq z \leq 8$); a metal complex oxide; lithium metal; a lithium alloy; a silicon-based alloy; a tin-based alloy; a metal oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; Li—Co—Ni-based materials; and the like. The separator and the separation film are interposed between the positive electrode and the negative electrode, and an insulating thin film having high ion permeability and mechanical strength is used. A pore diameter of the separator is about 0.01 to 10 μm, and the thickness is about 5 to 300 μm. As the separator, for example, olefinic polymers such as polypropylene, which is chemically resistant and hydrophobic, or a sheet or a nonwoven fabric made of glass fiber, polyethylene, or the like, is used. When a solid electrolyte such as a polymer is used as an electrolyte, the solid electrolyte may also serve as a separator.

In addition, in one specific example, in order to improve safety of a battery having high energy density, the separator and/or the separation film may be an organic/inorganic complex porous safety-reinforcing separator (SRS).

The SRS is manufactured by using inorganic particles and a binder polymer on the polyolefin-based separator substrate as an active layer component. In addition to the pore structure contained in the separator substrate itself, the separator has a structure in which pores are uniformly formed by interstitial volume between the inorganic particles.

When the organic/inorganic composite porous separator is used, compared to a case of using a typical separator, an increase of a battery thickness due to swelling in formation can be suppressed, and when a polymer that can be gelable when being impregnated in a liquid electrolyte is used as a binder polymer component, it can also be used as an electrolyte.

In addition, the organic/inorganic composite porous separator can exhibit excellent adhesion characteristics by controlling the contents of the inorganic particles and the binder polymer, which are the active layer components in the separator, so that the battery assembly process can be easily performed.

The inorganic particles are not particularly limited as long as they are electrochemically stable. That is, the inorganic particles that can be used in the present invention are not particularly limited as long as an oxidation and/or reduction reaction does not occur in an operating voltage range of the applied battery (for example, 0 to 5 V based on Li/Li+). Particularly, when inorganic particles having ion-transferring ability are used, ion conductivity in an electrochemical device can be increased to thereby improve performance, and accordingly, the ionic conductivity is preferably as high as possible. When the inorganic particles have high density, it is difficult to disperse the inorganic particles at the time of coating, and the weight is also increased in the production of a battery, such that it is preferable that the density is as small as possible. In the case of an inorganic substance having a high dielectric constant, a degree of dissociation of an electrolyte salt in a liquid electrolyte, for example, a lithium salt, can be increased so that ionic conductivity of the electrolytic solution can be improved.

The nonaqueous electrolytic solution containing a lithium salt is formed of a polar organic electrolytic solution and a lithium salt. As the electrolytic solution, a non-aqueous liquid electrolyte, an organic solid electrolyte, an inorganic solid electrolyte, and the like are used.

As the nonaqueous liquid electrolytic solution, for example, an aprotic organic solvent such as N-methyl-2-pyrrolidinone, propylene carbonate, ethylene carbonate, butylene carbonate, dimethyl carbonate, diethyl carbonate, gamma-butyrolactone, 1,2-dimethoxyethane, tetrahydroxyfuran, 2-methyltetrahydrofuran, dimethyl sulfoxide, 1,3-dioxolane, formamide, dimethylformamide, dioxolane, acetonitrile, nitromethane, methyl formate, methyl acetate, phosphoric acid triester, trimethoxymethane, a dioxolane derivative, sulfolane, methyl sulfolane, 1,3-dimethyl-2-imidazolidinone, a propylene carbonate derivative, a tetrahydrofuran derivative, ether, methyl pyrophosphate, ethyl propionate, and the like can be used.

As the organic solid electrolyte, for example, a polymer including a polyethylene derivative, a polyethylene oxide derivative, a polypropylene oxide derivative, a phosphate ester polymer, a polyagitation lysine, a polyester sulfide, a polyvinyl alcohol, a polyvinylidene fluoride, polymers containing ionic dissociation groups, and the like may be used.

As the inorganic solid electrolyte, for example, nitrides of Li such as $Li_3N$, $LiI$, $Li_5NI_2$, $Li_3N$-$LiI$-$LiOH$, $LiSiO_4$, $LiSiO_4$-$LiI$-$LiOH$, $Li_2SiS_3$, $Li_4SiO_4$, $Li_4SiO_4$-$LiI$-$LiOH$, $Li_3PO_4$—$Li_2S$—$SiS_2$, and the like, and halides, sulfates, and the like, may be used.

The lithium salt is a substance which is soluble in the non-aqueous electrolyte, and for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborane, lower aliphatic carbonic acid lithium, 4-phenyl boric acid lithium, imide, and the like may be used.

In addition, for the purpose of improving the charge-discharge characteristics and the flame retardancy, non-aqueous liquid electrolytes include, for example, pyridine, triethylphosphite, triethanolamine, cyclic ether, ethylenediamine, n-glyme, hexaphosphoric triamide, benzene derivatives, sulfur, quinone imine dyes, N-substituted oxazolidinones, N,N-substituted imidazolidines, ethylene glycol dialkyl ethers, ammonium salts, pyrrole, 2-methoxyethanol, aluminum trichloride, and the like may be added. In some cases, a halogen-containing solvent such as carbon tetrachloride or ethylene trifluoride may be further added to impart inflammability, or carbon dioxide gas may be further added to improve high-temperature storage characteristics.

Advantageous Effect

The present invention provides a battery pack including one or more battery cells and a device including the battery pack, and the device may be one of a mobile phone, a tablet computer, a notebook computer, a power tool, a wearable electronic device, an electric vehicle, a hybrid electric vehicle, a plug-in hybrid electric vehicle, and a power storage device.

The above-described devices or apparatuses are well known in the art, and therefore a detailed description thereof will be omitted herein.

MODE FOR INVENTION

Hereinafter, an exemplary embodiment of the present invention is described in detail with reference to the drawings, but the scope of the present invention is not limited thereto.

Figure 1:
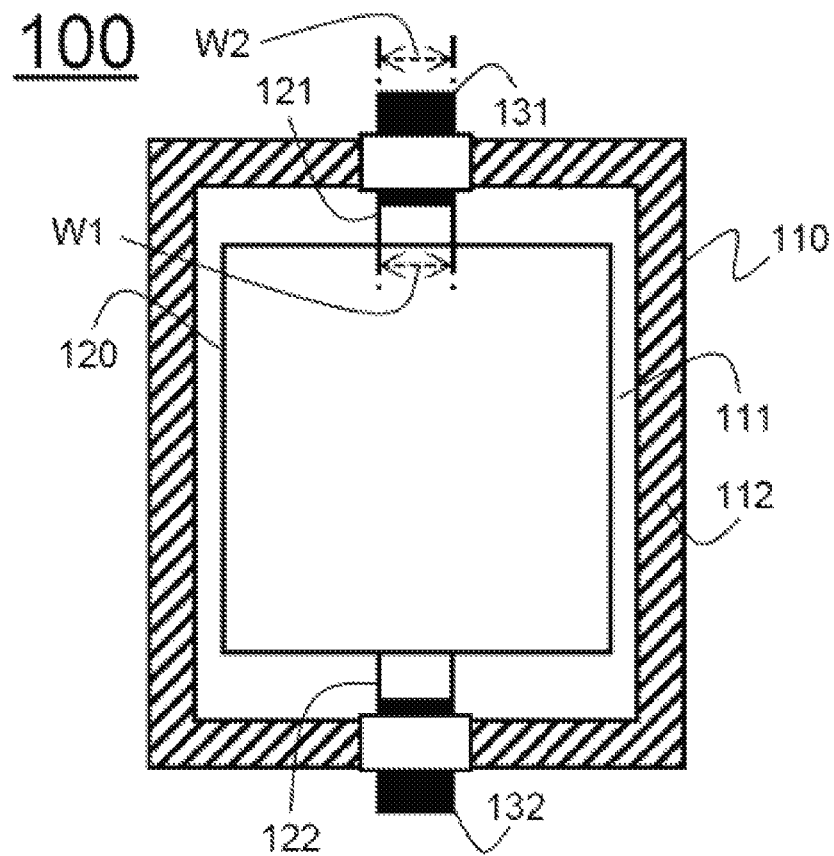
FIG. 1 illustrates a schematic view of a structure of a conventional pouch-type battery cell.
Figure 2:
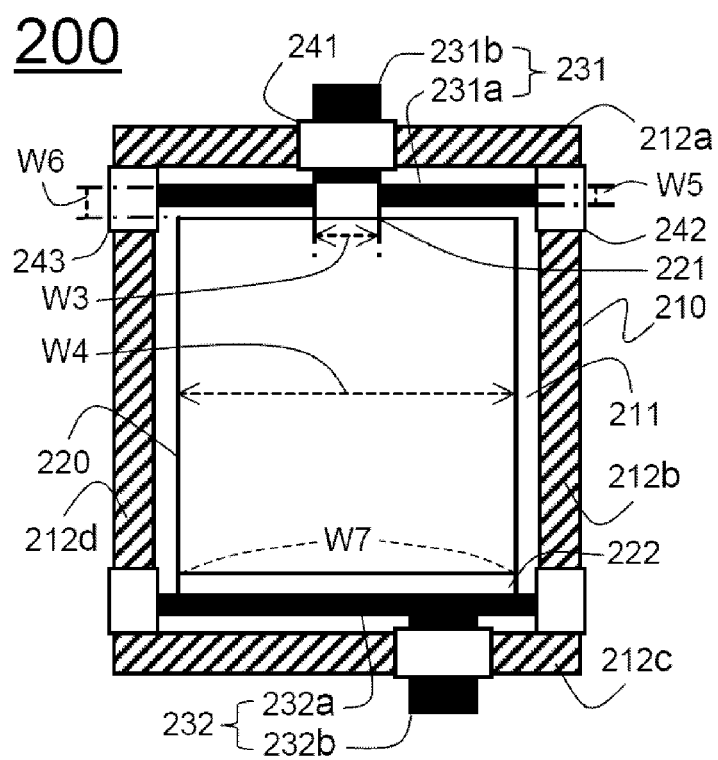
FIG. 2 illustrates a schematic view of a structure of a battery cell according to an exemplary embodiment of the present invention.

FIG. 2 illustrates a schematic view of a structure of a battery cell according to an exemplary embodiment of the present invention.

Referring to FIG. 2, a battery cell 200 is formed to have a structure in which external sides 212*a*, 212*b*, 212*c*, and 212*d* of a pouch-type battery case 210 are sealed by heat fusion in a state in which an electrode assembly 220 is received in a receiving portion 211 of the pouch-type battery case 210 made of a laminate sheet.

The electrode assembly 220 includes a positive electrode tab 221 and a negative electrode tab 222 protruding toward the upper and lower external sides 212*a* and 212*c* facing each other.

The positive electrode tab 221 is formed to have a structure in which a length W3 of a width direction perpendicular to the protruding direction is smaller than a width W4 of the electrode assembly 220 of a rectangular shape, and it is electrically connected to a positive electrode lead 231.

The positive electrode lead 231 includes a tab connecting portion 231*a* and a protruding extension.

The tab connecting portion 231*a* is combined with the positive electrode tab 221 by welding, and opposite end positions of the positive electrode tab 221 in the width direction perpendicular to the protruding direction are formed to respectively have a length reaching the opposite lateral heat fusion external sides 212*b* and 212*d* of the battery case 210.

Accordingly, opposite end portions of the tab connecting portion 231*a* are respectively positioned at the opposite lateral heat fusion external sides 212*b* and 212*d* of the battery case 210, and insulating films 242 and 243 are respectively interposed between the opposite end portions of the tab connecting portion 231*a* and the opposite lateral heat fusion external sides 212*b* and 212*d* of the battery case 210 so that sealing force by heat fusion is improved.

Accordingly, when the positive electrode tab 221 is combined to the positive electrode lead 231, it is possible to prevent problems such as a step caused by displacement of the connection position between the positive electrode lead 231 and the positive electrode tab 221.

The tab connecting portion 231*a* is formed for a length W5 of the same direction as the protruding direction of the positive electrode tab 221 to be about 60% of a protruding length W6 of the positive electrode tab 221.

Accordingly, the tab connecting portion 231*a* may be stably fixed to prevent an internal short circuit or structural damage due to direct contact of the tab connecting portion 231*a* and the electrode assembly 220.

A protruding extension 231*b* is integrally formed with the tab connecting portion 231*a*, and protrudes toward the upper heat fusion external side 212*a* of the battery case 210 corresponding to the protruding portion of the positive electrode tab 221. An insulating film 241 is interposed between the protruding extension 231*b* and the upper heat fusion external side 212*a* of the battery case 210 so as to improve the sealing force by heat fusion.

The negative electrode tab 222 is formed to have structure in which a length W7 of the width direction perpendicular to the protruding direction is the same as the width W4 of the electrode assembly 220 of the rectangular shape, and is electrically connected to a negative electrode lead 232.

Accordingly, it is possible to effectively eliminate heat generated at a connecting portion between the negative electrode tab 222 and a tab connecting portion 232*a* of the negative electrode lead 232 through the negative electrode tab 222 of a large area.

The negative electrode lead 232 is the same as the positive electrode lead 231 except that a protruding extension 232*b* is positioned to be adjacent to the lower heat fusion external side 212*c* of the battery case 210 in one side direction of the heat fusion external side 212*b*, thus a detailed description thereof will be omitted.

Figure 3:
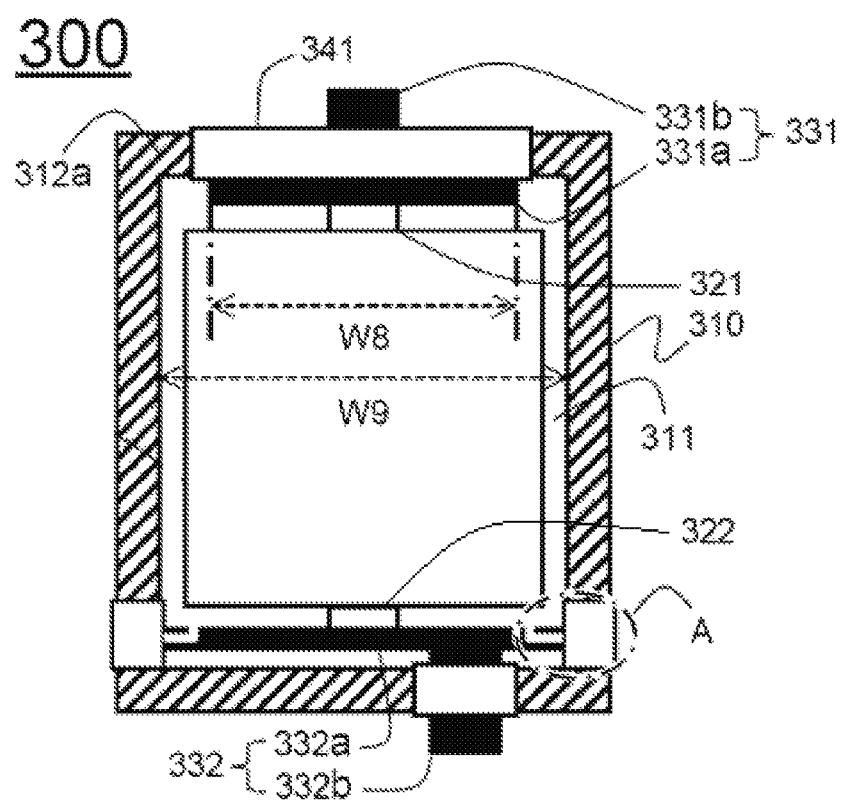
FIG. 3 illustrates a schematic view of a structure of a battery cell according to another exemplary embodiment of the present invention.

FIG. 3 illustrates a schematic view of a structure of a battery cell according to another exemplary embodiment of the present invention.

Referring to FIG. 3, a battery cell 300 is formed to have a structure sealed by heat fusion in a state in which an electrode assembly 320 is received in a receiving portion 311 of the pouch-type battery case 310 made of a laminate sheet. A tab connecting portion 331*a* of a positive electrode lead 331 of a battery cell 300 is formed for a length W8 of a width direction perpendicular to a protruding direction of a positive electrode tab 321 to be smaller than a width W9 of the receiving portion 311 of a battery case 310.

The tab connecting portion 331*a* of the positive electrode lead 331 is partially positioned at an upper heat fusion external side 312*a* and 312*b* of the battery case 310 from which a protruding extension 331*b* protrudes, and an insulating film 341 is interposed between the tab connecting portion 331*a* of the positive electrode lead 331 and the protruding extension 331*b* and the upper heat fusion external side 312*a* and 312*b* of the battery case 310 so that the sealing force by the heat fusion may be improved.

Accordingly, the positive electrode lead 331 may be stably fixed in the battery case 310.

A negative electrode tab 322 protrudes in a direction facing the positive electrode tab 321, and is formed to have the same structure as that of the positive electrode tab 321.

A negative electrode lead 332 includes a tab connecting portion 332*a* and a protruding extension 332*b*. Venting flow paths are formed at opposite end portions of the negative electrode lead 332 of the tab connecting portion 332*a* so that gas inside the battery case 310 may be discharged to the outside.

A detailed structure of a portion "A" in which the venting flow path is formed will now be described in detail with reference to FIG. 4.

A remaining structure except for the structure of the portion "A" is the same as that of the battery cell 200 of FIG. 2, so a detailed description thereof will be omitted.

Figure 4:
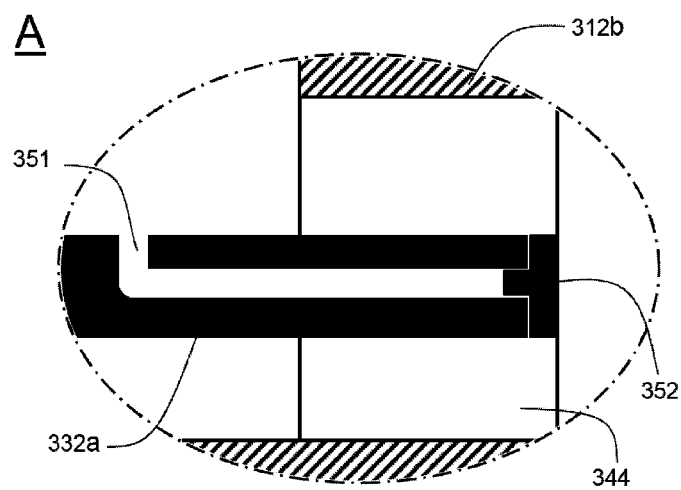
FIG. 4 illustrates an enlarged view of a portion "A" of FIG. 3.

FIG. 4 illustrates an enlarged view of a portion "A" of FIG. 3.

Referring to FIG. 4, a venting flow path 351 is formed in an end portion of the tab connecting portion 332*a* of the negative electrode lead.

The venting flow path 351, which has a bent structure, is formed in a direction of the lateral heat fusion external side of the battery case from the external side of a direction of an electrode assembly so that the gas inside the battery case may be discharged to the outside.

In an insulating film 344 positioned at the lateral heat fusion external side 312*b* of the battery case, an openable and closable venting valve 352 is positioned at a position corresponding to the end portion of the venting flow path 351.

Accordingly, when a pressure inside the battery cell increases above a threshold pressure due to the gas generated inside the battery cell, the venting valve 352 is separated from the end portion of the venting flow path 351 and then discharges the gas, thereby securing safety of the battery cell.

Figure 5:
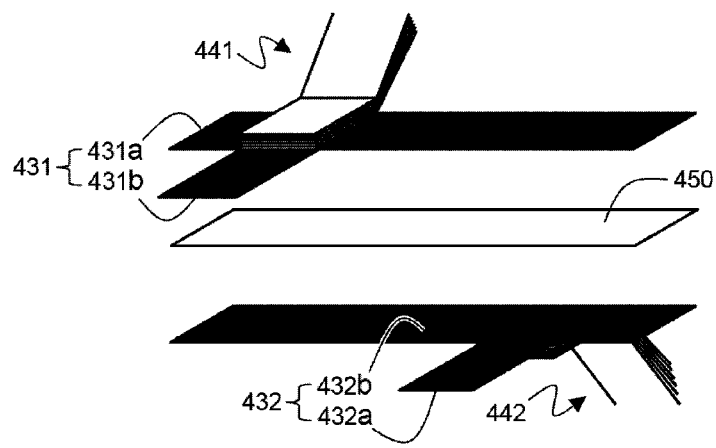
FIG. 5 illustrates a schematic view of structures of a positive electrode lead and a negative electrode lead of a battery cell according to another exemplary embodiment of the present invention.

FIG. 5 illustrates a schematic view of structures of a positive electrode lead and a negative electrode lead of a battery cell according to another exemplary embodiment of the present invention.

Referring to FIG. 5, a positive electrode tab 441 and a negative electrode tab 442 protrude in the same direction.

The positive electrode tab 441 is combined to a tab connecting portion 431*a* of a positive electrode lead 431 in an upper surface of the positive electrode lead 431, and the negative electrode tab 442 is combined to a tab connecting portion 432*a* of the negative electrode lead 432 in a lower surface of a negative electrode lead 432.

A protruding extension 431*b* of the positive electrode lead 431 has an integral structure with the tab connecting portion 431*a*, and is positioned at a portion from which the positive electrode tab 441 protrudes.

A protruding extension 432*b* of the negative electrode lead 432 has an integral structure with the tab connecting portion 432*a*, and is positioned at a portion from which the negative electrode tab 442 protrudes.

The tab connecting portion 431*a* of the positive electrode lead 431 and the negative electrode lead 432 of the tab connecting portion 432*a* are formed to have the same size, and an insulator 450 is interposed between the positive electrode lead 431 of the tab connecting portion 431*a* and the tab connecting portion 432*a* of the negative electrode lead 432.

Accordingly, since the positive electrode lead 431 and the negative electrode lead 432 do not directly contact each other, it is possible to prevent an internal short, and it is possible to acquire a desired effect by being easily applied to a structure in which the positive electrode tab 441 and the negative electrode tab 442 protrude in the same direction.

It will be understood by those skilled in the art that various changes in form and details may be made therein without departing from the spirit and scope of the invention as defined by the appended claims.

As described above, according to the battery cell of the present invention, the tab connecting portion of the electrode lead is formed to have a relatively large size as compared with the electrode tab, thereby the heat generated at the connecting portion between the electrode lead and the electrode tab may be effectively eliminated through the tab connecting portion having the larger size, the structural stability of the battery cell may be improved by supplementing the mechanical rigidity of the connecting portion between the electrode lead and the electrode tab, and since the electrode lead and the electrode tab may be connected more easily, occurrence of the step may be prevented such that the defect rate of the product may be reduced, and simultaneously, the overall stability of the battery cell may be improved.

The invention claimed is:

1. A battery cell comprising:
an electrode assembly including an electrode tab protruding toward at least one external side;
a battery case including a receiving portion in which the electrode assembly is received; and
an electrode lead connected to the electrode tab, the electrode lead configured to be connected to an external device, wherein the electrode lead includes:
a tab connecting portion electrically connected to the electrode tab; and
a protruding extension protruding outside of the battery case and extending from the tab connecting portion, the protruding extension configured to be electrically connected to the external device,
the tab connecting portion having a width in a lateral direction perpendicular to a protruding direction of the protruding extension that is larger than a width of the electrode tab in the lateral direction, and
the tab connecting portion having opposite end portions spaced apart from one another in the lateral direction, the opposite end portions extending to contact opposite lateral heat fusion external sides of the battery case, respectively, the opposite lateral heat fusion external sides being spaced apart from one another in the lateral direction.

2. The battery cell of claim 1, wherein
the battery case is a pouch-type case made of a laminate sheet including a resin layer and a metal layer, and an external side of the receiving portion of the electrode assembly is sealed by heat fusion.

3. The battery cell of claim 1, wherein
the tab connecting portion is formed so that a length of the width direction perpendicular to the protruding direction of the electrode tab is smaller than a width of the receiving portion of the battery case corresponding thereto.

4. The battery cell of claim 1, wherein
at least some of the tab connecting portion having the length of the width direction being relatively larger than that of the electrode tab is positioned at the heat fusion external side.

5. The battery cell of claim 1, wherein
an insulating film is interposed between the opposite end portions of the tab connecting portion and the opposite lateral heat fusion external sides of the battery case so that a sealing force by the heat fusion is improved.

6. The battery cell of claim 1, wherein
at least one of the opposite end portions of the tab connecting portion is provided with a venting flow path so that gas inside the battery case is discharged to the outside.

7. The battery cell of claim 6, wherein
the venting flow path is formed in a direction of the lateral heat fusion external side of the battery case from the external side of the tab connecting portion adjacent to the electrode assembly, and an openable and closable venting valve is positioned at a position corresponding to an end portion of the venting flow path in the lateral heat fusion external side of the battery case.

8. The battery cell of claim 7, wherein
the venting valve is separated from the end portion of the venting flow path to discharge gas when a pressure inside the battery cell is equal to and more than a threshold pressure.

9. The battery cell of claim 8, wherein
the threshold pressure at which the venting valve is separated is 2 atm to 4 atm.

10. The battery cell of claim 1, wherein
the tab connecting portion is formed so that a length of the same direction as the protruding direction of the electrode tab is 10% to 90% of a protruding length of the electrode tab.

11. The battery cell of claim 1, wherein the electrode tab is formed so that the length of the width direction perpendicular to the protruding direction is the same as a width of the external side of the electrode assembly corresponding thereto.

12. The battery cell of claim 1, wherein electrode tabs having different polarities from each other protrude from opposite ends of the battery case.

13. The battery cell of claim 1, wherein the electrode tab is a first electrode tab, the battery cell including a second electrode tab, the first and second electrode tabs having different polarities from each other protrude toward the same external side.

14. The battery cell of claim 13, wherein the electrode lead is a first electrode lead, the battery cell including a second electrode lead, and an insulator is interposed between the tab connecting portion of the first electrode lead and a tab connection portion of the second electrode lead.

15. The battery cell of claim 1, wherein an insulating film is interposed between the protruding extension of the electrode lead and the heat fusion external side of the battery case.

16. The battery cell of claim 1, wherein the electrode assembly is formed to have a structure in which a positive electrode sheet and a negative electrode sheet between which a separation membrane sheet is interposed are wound.

17. The battery cell of claim 1, wherein the electrode assembly is formed to have a structure in which unit cells of a stacked structure formed with a positive electrode, a negative electrode, and a separation membrane interposed between the positive electrode and the negative electrode are continuously wound by a separation film.

18. A battery pack including one or more battery cells of claim 1.

19. A device including one or more battery packs of claim 18.

* * * * *